(Model.)
3 Sheets—Sheet 1.
D. B. SPEER.
MACHINE FOR CUTTING GREEN CORN OFF THE COB.
No. 257,524. Patented May 9, 1882.
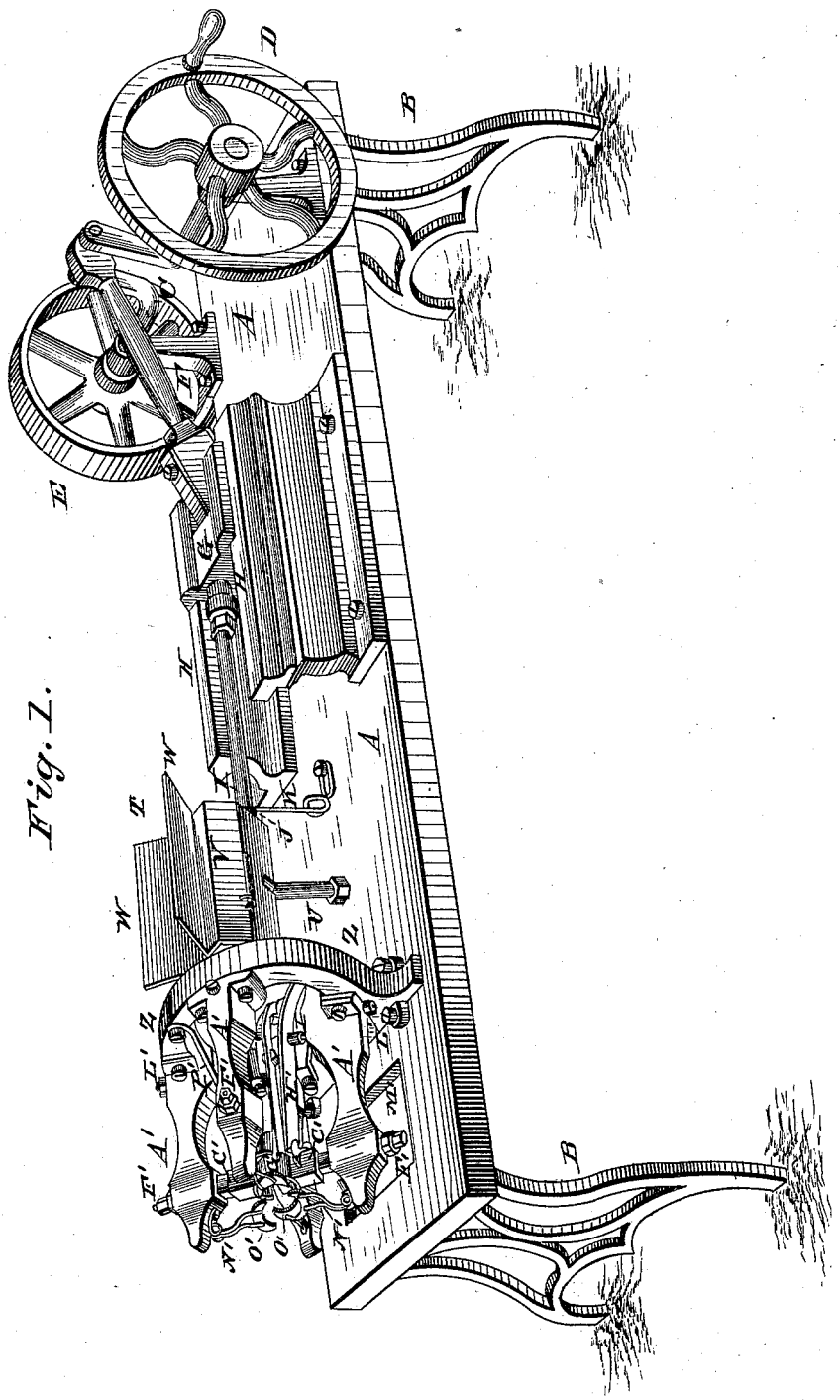
WITNESSES:
INVENTOR.
ATTORNEYS.

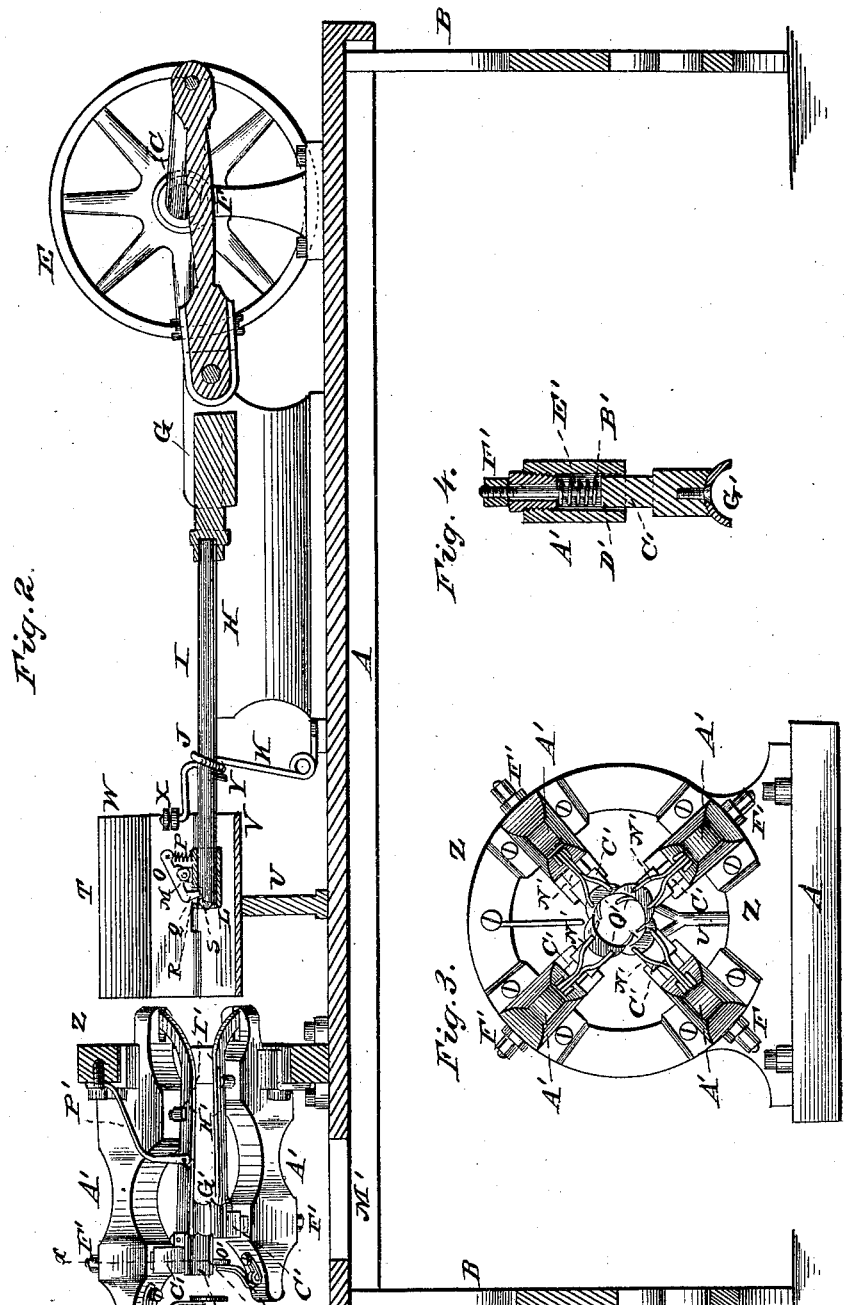

(Model.)     3 Sheets—Sheet 3.

D. B. SPEER.
MACHINE FOR CUTTING GREEN CORN OFF THE COB.

No. 257,524.     Patented May 9, 1882.

WITNESSES:
Fred. G. Dieterich
P. C. Dieterich

INVENTOR.
D. B. Speer
by C. A. Snow & Co.
ATTORNEYS.

N. PETERS, Photo-Lithographer, Washington, D. C.

UNITED STATES PATENT OFFICE.

DARIUS B. SPEER, OF BLUE GRASS, IOWA.

MACHINE FOR CUTTING GREEN CORN OFF THE COB.

SPECIFICATION forming part of Letters Patent No. 257,524, dated May 9, 1882.

Application filed February 20, 1882. (Model.)

*To all whom it may concern:*

Be it known that I, DARIUS B. SPEER, of Blue Grass, in the county of Scott and State of Iowa, have invented certain new and useful Improvements in Machines for Cutting Green Corn off the Cob; and I do hereby declare that the following is a full, clear, and exact description of the invention, which will enable others skilled in the art to which it appertains to make and use the same, reference being had to the accompanying drawings, which form a part of this specification.

Figure 5:
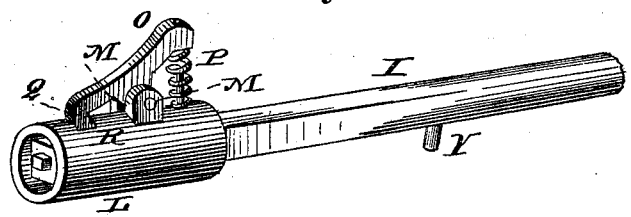
Figure 6:
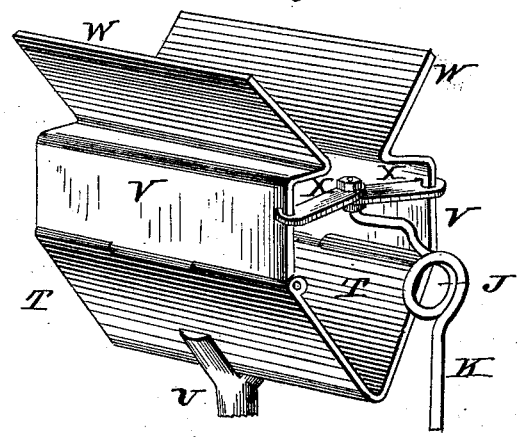
Figure 7:
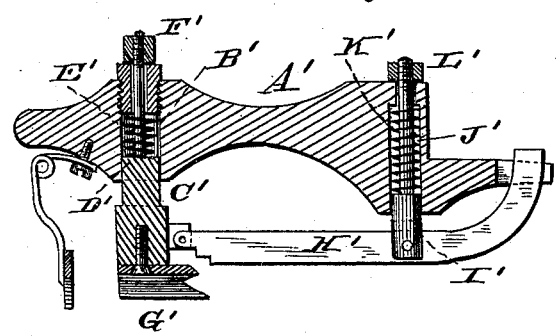

Figure 1 is a perspective view of my improved machine for cutting green corn off the cob. Fig. 2 is a longitudinal vertical sectional view. Fig. 3 is an end view. Fig. 4 is a detail section on the line $x\,x$, Fig. 2. Fig. 5 is a detail view, on an enlarged scale, of the plunger and plunger-rod. Fig. 6 is a detail view of the hopper, and Fig. 7 is a longitudinal sectional view of one of the knife-arms and guards.

Corresponding parts in the several figures are denoted by like letters of reference.

This invention relates to machines for cutting green corn off the cob for canning and other purposes; and it consists in certain improvements in the construction of the same, which will be hereinafter fully described, and particularly pointed out in the claims.

In the drawings hereto annexed, A represents a suitable bed-plate or table, mounted upon legs B B.

C is a crank-shaft, mounted in suitable bearings near one end of the table and carrying the fly-wheel D and a drum or band-wheel, E, through which motion is imparted to the machine from any suitable power. The crankshaft C is connected by a pitman, F, with a cross-head, G, sliding between guides H, secured longitudinally at the sides of the table.

I is the plunger-rod, which is secured to the cross-head G, and extends toward the rear end of the bed or table, passing through an eye, J, formed upon a spring-bracket, K, which is secured upon the table, as shown. The plunger-rod I carries at its front end the plunger or plunger-head L, which consists of a short tubular sleeve fitted upon the rod and having a concave or cup-shaped rear end, and provided upon its upper side with wings or lugs M, between which is pivoted a lever or latch, O, the front end of which is held in a raised position by a suitably-arranged spring, P, while its rear end is provided with a downward-projecting tooth or point, Q, extending through a perforation, R, in the sleeve or plunger, and engaging a notch, S, in the plunger-rod, to which the said sleeve is thus secured.

T is a hopper or trough, made V-shaped in cross-section and mounted upon an upright, U, on the table or bed-plate. To the sides or edges of the trough T are hinged wings or flaps V by means of spring-hinges, which tend to force said wings automatically toward each other, thus keeping them in a closed position. The wings V are provided with upward and outward projecting flanges W, forming, as it were, a supplementary hopper, the object of which will be hereinafter described. The front ends of the wings V are connected by toggle-joints X with the spring-bracket K, to which reference has been made above. The plunger-rod I is provided in rear of said spring-bracket with a cross-pin, Y, which, when the plunger-rod is drawn in a forward direction, strikes the spring-bracket K, (through the eye J of which the said plunger-rod passes,) forcing it forward against its tension, thus, through the intermediate toggle-joints, opening the wings V or drawing them apart. When the pressure upon the spring-bracket is released the tension of said bracket co-operates with the spring-hinges to close the wings or flaps.

Z is a circular frame or bracket, secured transversely upon the table or bed-plate in rear of the hopper. Said frame is provided with rearwardly-extending arms or brackets A', four in number, located equal distances apart, and provided near their rear ends with perforations or sockets B', in which the knife-carrying shanks C' are adjustable as follows: The said shanks C' are formed with shoulders D', between which and the outer ends of the perforations or sockets B' springs E' are interposed, which serve to force the said shanks radially in an inward direction. The outer ends of shanks C' are screw-threaded, to receive nuts F', by tightening or adjusting which the inward movement of said shanks may be limited and regulated. The inner ends of shanks C' carry the knives or cutters G', which are curved, as shown, so as to embrace the ear of corn passing between them and remove the grain from the cob. Two of the knives or cutters are placed slightly in advance of the other two, in order that the grain may be thoroughly removed.

To the front sides of the shanks C' are hinged the guards H', which project forwardly, as shown, and have their rear ends curved outwardly, as shown, in order to facilitate the entrance between them of the ears of corn. The guards H' are hinged near their front ends to rods I', sliding radially in sockets J' in the arms A', near the front ends of the latter, and forced in an inward direction by suitably-arranged springs K', the extent of the inward movement of said rods being regulated by nuts L', adjustable upon the outer threaded ends of the rods I'. It will be seen that by this arrangement the guards H' are mounted flexibly, so that an ear of corn passing between them will be embraced at all points firmly and evenly by the said guards. The table or bed-plate has an opening, M', through which the corn may drop into a suitable receptacle placed below.

To the rear ends of the arms A' are secured spring-brackets N', carrying crescent-shaped scrapers O', which serve to remove from the cobs the particles of grain which the knives or cutters may have failed to remove.

Secured to the frame Z is an arm or bracket, P', projecting downwardly and rearwardly from said frame, and serving to strike and operate the latch-lever O of the plunger, thus releasing said plunger from the plunger-rod on the rearward stroke of the latter.

The operation of my invention is as follows: The ears of corn are fed in any suitable manner to the hopper, formed by the flaring or flanged wings v, hinged to the sides of the trough T. On the forward stroke of the plunger-rod the pin Y strikes spring-bracket K, thus causing the wings V to open and an ear of corn to drop down into trough T directly in rear of the plunger. On the rearward stroke of the plunger-rod the pressure upon bracket K is released, thus causing the wings V to close. The ear of corn is pushed from trough T in between the guards or guides H', which yield, as previously described, so as to embrace and hold the ear firmly without interfering with its motion longitudinally. When the plunger reaches the arm or bracket P' the latter strikes the lever-latch O, releasing it from the notch S in the plunger-rod. The plunger now remains stationary between the guards H', while the plunger-rod completes its stroke, pushing the ear of corn in between the knives or cutters, which remove the grain from the cob, the grain dropping through opening M' into a suitable receptacle. The plunger-rod now again moves forward, the tension of spring P causing the latch O to engage the notch S in the plunger-rod, to which the plunger is thus again connected.

The operation above described is repeated, with the exception that as the second ear of corn passes between the knives it pushes the first ear out between the scrapers O', which remove the last remaining particles of grain, after which the cob drops down in rear of the machine, where a basket or other receptacle may be placed to receive it.

Having thus described my invention, I claim and desire to secure by Letters Patent of the United States—

1. The combination, with the plunger-rod I, having notch S, of the plunger-head L, consisting of a sleeve having cup-shaped rear end and provided with notch or opening R, lever-latch O, having tooth Q and spring P, and mechanism for operating said lever-latch, as set forth.

2. In a machine for cutting green corn off the cob, the combination of the trough T, having hinged flanged wings V, with mechanism, substantially as described, for automatically opening and closing the said wings, as set forth.

3. The combination of the trough T, the flanged wings V, connected to said trough by spring-hinges, the spring-bracket K, having eye J, the toggle-joints X, connecting said spring-bracket with the wings V, the plunger-rod I, having cross-pin Y, and mechanism for reciprocating the said plunger-rod, substantially as set forth.

4. In a machine for cutting green corn off the cob, the combination of the frame Z, having arms A', the shanks C', and rods I', mounted in sockets radially in said arms, springs for forcing the said shanks and rods in an inward direction, nuts for limiting their movement, and the guards H', hinged, as described, to the said shanks C' and rods I', as set forth.

5. The combination, with the shanks C', arranged as herein described, and having knives or cutters G', of the guards H', hinged to said shanks and to the rods I', arranged as herein shown, so that the front and rear ends of said guards shall be forced independently in an inward direction, as set forth.

6. As an improvement in machines for cutting green corn off the cob, the combination of the bed-plate or table, the trough or hopper having hinged flanged wings, the plunger-rod having plunger-head connected thereto by suitable latch mechanism and provided with a cross-pin, Y, the spring-bracket K, having eye J, and connected by toggle-joints to the hinged flanged wings of the trough or hopper, the frame Z, having arm or bracket P', and arms carrying the knives or cutters and guards or guides and the crescent-shaped scrapers, and suitable operating mechanism, all arranged and operating substantially as and for the purpose set forth.

In testimony that I claim the foregoing as my own I have hereto affixed my signature in the presence of two witnesses.

DARIUS B. SPEER.

Witnesses:
HUGH CARPENTER,
J. R. PORTER.